(12) United States Patent
Hong et al.

(10) Patent No.: US 10,840,501 B2
(45) Date of Patent: Nov. 17, 2020

(54) POSITIVE ELECTRODE ADDITIVE AND PREPARATION METHOD THEREFOR, POSITIVE ELECTRODE PLATE AND SECONDARY LITHIUM ION BATTERY

(71) Applicant: CONTEMPORARY AMPEREX TECHNOLOGY CO., LIMITED, Ningde (CN)

(72) Inventors: Xiang Hong, Ningde (CN); Lingyan Jiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 137 days.

(21) Appl. No.: 16/267,009

(22) Filed: Feb. 4, 2019

(65) Prior Publication Data

US 2019/0207204 A1 Jul. 4, 2019

Related U.S. Application Data

(63) Continuation of application No. PCT/CN2017/093546, filed on Jul. 19, 2017.

(30) Foreign Application Priority Data

Aug. 25, 2016 (CN) .......................... 2016 1 0720562

(51) Int. Cl.

| | |
|---|---|
| *H01M 4/131* | (2010.01) |
| *H01M 4/133* | (2010.01) |
| *H01M 4/62* | (2006.01) |
| *H01M 10/0525* | (2010.01) |
| *H01M 4/136* | (2010.01) |
| *C01G 51/06* | (2006.01) |
| *C01D 15/08* | (2006.01) |
| *H01M 4/36* | (2006.01) |
| *H01M 4/1393* | (2010.01) |
| *H01M 4/583* | (2010.01) |
| *H01M 4/02* | (2006.01) |

(52) U.S. Cl.
CPC ............ *H01M 4/133* (2013.01); *C01D 15/08* (2013.01); *C01G 51/06* (2013.01); *H01M 4/131* (2013.01); *H01M 4/136* (2013.01); *H01M 4/1393* (2013.01); *H01M 4/366* (2013.01); *H01M 4/583* (2013.01); *H01M 4/62* (2013.01); *H01M 10/0525* (2013.01); *H01M 2004/028* (2013.01)

(58) Field of Classification Search
CPC ...... H01M 4/131; H01M 4/133; H01M 4/366; H01M 4/136; C01G 51/06; C01D 15/08
See application file for complete search history.

(56) References Cited

U.S. PATENT DOCUMENTS

| | | | | |
|---|---|---|---|---|
| 5,891,416 | A * | 4/1999 | Yamazaki | C01G 51/42 423/594.6 |
| 9,214,674 | B2 * | 12/2015 | Yoshida | H01M 4/366 |
| 9,780,349 | B2 * | 10/2017 | Zhamu | H01M 2/1686 |
| 10,497,968 | B2 * | 12/2019 | Zhamu | H01M 10/056 |
| 2012/0094177 | A1 * | 4/2012 | Honoki | H01M 4/0404 429/211 |
| 2012/0231343 | A1 * | 9/2012 | Nagase | C01G 53/44 429/231.1 |
| 2015/0064568 | A1 * | 3/2015 | Yushin | H01M 10/054 429/233 |
| 2015/0099193 | A1 * | 4/2015 | Hamasaki | H01M 10/052 429/338 |
| 2015/0263341 | A1 * | 9/2015 | Kato | C01G 45/1214 429/223 |
| 2016/0248121 | A1 * | 8/2016 | Uematsu | H01M 2/0207 |
| 2017/0162864 | A1 * | 6/2017 | Peled | H01M 4/26 |
| 2017/0194628 | A1 * | 7/2017 | Kibune | H01M 4/625 |
| 2018/0159109 | A1 * | 6/2018 | Tsubouchi | H01M 2/1241 |
| 2019/0010057 | A1 * | 1/2019 | Shin | C01B 32/21 |
| 2019/0013508 | A1 * | 1/2019 | Takanashi | H01M 4/5825 |
| 2019/0020034 | A1 * | 1/2019 | Umetsu | H01G 11/46 |
| 2019/0027754 | A1 * | 1/2019 | Kamijo | H01M 4/1393 |
| 2019/0044130 | A1 * | 2/2019 | Ogata | H01M 4/386 |

(Continued)

FOREIGN PATENT DOCUMENTS

| | | |
|---|---|---|
| CN | 103633385 A | 3/2014 |
| CN | 104377343 A | 2/2015 |

(Continued)

OTHER PUBLICATIONS

Machine Translation of CN 10490097 (no date).*

(Continued)

*Primary Examiner* — Amanda C. Walke

(74) *Attorney, Agent, or Firm* — Morgan, Lewis & Bockius LLP

(57) ABSTRACT

The present disclosure provides a positive electrode additive and a preparation method thereof, a positive electrode plate and a lithium-ion secondary battery. The positive electrode additive comprises a modified lithium carbonate. The modified lithium carbonate comprises a lithium carbonate particle and a polymer coating. The polymer coating coats a surface of the lithium carbonate particle and comprises a polymer. The positive electrode additive of the present disclosure has low cost and simple preparation method, when the positive electrode additive is applied in lithium-ion secondary battery, it can significantly improve lithium-ion secondary battery safety performance without affecting electrical performance of the lithium-ion secondary battery.

20 Claims, No Drawings

(56) References Cited

U.S. PATENT DOCUMENTS

2019/0348666 A1* 11/2019 Kim ............... H01M 4/131
2020/0091507 A1* 3/2020 Zhamu ............ H01M 4/5815

FOREIGN PATENT DOCUMENTS

| CN | 102007623 | B |   | 3/2015 |
| CN | 104466135 | A |   | 3/2015 |
| CN | 103367714 | B |   | 5/2015 |
| CN | 104900907 | A |   | 9/2015 |
| CN | 105340123 | A |   | 2/2016 |
| CN | 105514417 | A |   | 4/2016 |
| CN | 105810885 | A | * | 7/2016 |
| GB | 1245321   | A |   | 9/1971 |

OTHER PUBLICATIONS

Shin et al , Effect of Li2CO3 additive on gas generation in lithium-ion batteries, Journal of Power Sciences, 109, 47-52 (2002). (Year : 2002).*
Dai et al, Extending the High-Voltage Capacity of LiCoO2 Cathode by Direct Coating of the Composite Electrode with Li2CO3 via Magnetron Sputtering, The Journal of Physical Chemistry, 120, 422-430 (2016).*
Garcia-Lastra et al, DFT+U Study of Polaronic Conduction in Li2O2 and Li2CO3: Implications for Li-Air Batteries, The Journal of Physical Chemistry, 117, 5568-5577 (2013).*
Jung et al, Li3BO3—Li2CO3: Rationally Designed Buffering Phase for Sulfide AllSolid-State Li-Ion Batteries, Chemistry of Materials, 30, 8190-8200 (2018).*
Contemporary Amperex Technology Co., Limited, International Search Report, PCT/CN2017/093546.
Contemporary Amperex Technology Co., Limited, Extended European Search Report, EP17842732.4, dated Jan. 2, 2020, 6 pgs.

* cited by examiner

POSITIVE ELECTRODE ADDITIVE AND PREPARATION METHOD THEREFOR, POSITIVE ELECTRODE PLATE AND SECONDARY LITHIUM ION BATTERY

CROSS REFERENCE TO RELATED APPLICATIONS

This application is a continuation application of PCT/CN2017/093546, filed on Jul. 19, 2017, which claims priority to Chinese Patent Application No. 201610720562.2, filed with the State Intellectual Property Office of the People's Republic of China on Aug. 25, 2016, all of which are incorporated herein by reference in their entirety.

FIELD OF THE PRESENT DISCLOSURE

The present disclosure relates to the field of battery technology, and more specifically relates to a positive electrode additive and a preparation method thereof, a positive electrode plate and a lithium-ion secondary battery.

BACKGROUND OF THE PRESENT DISCLOSURE

The lithium-ion secondary battery has advantages, such as high operating voltage, high specific energy, more cycle times, long storage time and the like, is widely applied not only in portable electronic devices, for example mobile telephone, digital camera, laptop and the like, but also widely applied in traffic tools, such as electric vehicle, electric bike and the like, here, electric traffic tools have more stringent requirement for safety performance of lithium-ion secondary battery.

As a driving power of electric traffic tools, the lithium-ion secondary battery generally has a pressure detecting type current cut-off device in addition to a vent. When gas is rapidly and abnormally generated inside the lithium-ion secondary battery, the current cut-off device starts up to cut off current so as to prevent occurring of thermal runaway of the lithium-ion secondary battery and avoid safety accidents.

In order to make the current cut-off device more sensitively monitor health status of the lithium-ion secondary battery and improve anti-overcharge performance of the lithium-ion secondary battery, generally in the prior art, lithium carbonate is added as an overcharge additive for generating gas into a positive electrode plate, when the operating voltage of the lithium-ion secondary battery reaches a certain extent, lithium carbonate will be decomposed to generate carbon dioxide which is used to start up the current cut-off device to ensure the safety performance of the lithium-ion secondary battery. However, an initial decomposition voltage of the lithium carbonate is too high (>4.8V), thermal runaway will occur in some high energy lithium-ion secondary batteries before reaching this voltage, in turn the current cut-off device cannot function before reaching this voltage. Increasing a content of the lithium carbonate in the positive electrode plate can improve voltage sensitivity of the lithium-ion secondary battery to some extent, but it will significantly decrease a content of active material in the positive electrode plate and whole energy density of the lithium-ion secondary battery.

SUMMARY OF THE PRESENT DISCLOSURE

In view of the problem existing in the background, an object of the present disclosure is to provide a positive electrode additive and preparation method thereof, a positive electrode plate and a lithium-ion secondary battery, the positive electrode additive can significantly improve safety performance of the lithium-ion secondary battery without affecting electrical performance of the lithium-ion secondary battery.

In order to achieve the above object, in a first aspect of the present disclosure, the present disclosure provides a positive electrode additive, which comprises a modified lithium carbonate. The modified lithium carbonate comprises a lithium carbonate particle and a polymer coating. The polymer coating coats a surface of the lithium carbonate particle and comprises a polymer.

In a second aspect of the present disclosure, the present disclosure provides a preparation method of a positive electrode additive for preparing the positive electrode additive of the first aspect of the present disclosure, which comprises steps of: (1) dispersing a lithium carbonate particle in a solution comprising a polymer and an organic solvent to prepare a suspension; (2) treating the suspension by spray drying to obtain the positive electrode additive.

In a third aspect of the present disclosure, the present disclosure provides a positive electrode plate, which comprises a positive electrode current collector and a positive electrode film. The positive electrode film is provided on the positive electrode current collector and comprises a positive electrode active material. Wherein, the positive electrode film further comprises the positive electrode additive according to the first aspect of the present disclosure. In a fourth aspect of the present disclosure, the present disclosure provides a lithium-ion secondary battery, which comprises the positive electrode plate according to the third aspect of the present disclosure.

Compared to the technologies in the background, the present disclosure has the following beneficial effects: the positive electrode additive of the present disclosure has low cost and simple preparation method, when the positive electrode additive is applied in the lithium-ion secondary battery, it can significantly improve the lithium-ion secondary battery safety performance without affecting electrical performance of the lithium-ion secondary battery.

DETAILED DESCRIPTION

Hereinafter a positive electrode additive and a preparation method thereof, a positive electrode plate and a lithium-ion secondary battery according to the present disclosure will be described in detail.

Firstly, a positive electrode additive according to a first aspect of the present disclosure will be described.

A positive electrode additive according to a first aspect of the present disclosure comprises a modified lithium carbonate. The modified lithium carbonate comprises a lithium carbonate particle and a polymer coating. The polymer coating coats a surface of the lithium carbonate particle and comprises a polymer.

In the positive electrode additive according to the first aspect of the present disclosure, by performing a polymer surface coating modification to an ordinary lithium carbonate particle, the polymer coating controls electronic resistance and ionic resistance of the lithium carbonate particle and an electrode plate to make a local voltage around the lithium carbonate particle higher than a whole voltage of the electrode plate, by controlling local voltage polarization around the lithium carbonate particle, the lithium carbonate particle is decomposed in advance before the whole lithium-ion secondary battery reaches an initial decomposition voltage, so that the initial decomposition voltage of the lithium carbonate particle can be adjusted in a large range according to actual demand, and the polymer surface coating modification will not affect electronic conduction and ionic conduction of the lithium carbonate particle in the electrode plate.

In the positive electrode additive according to the first aspect of the present disclosure, an average particle size (that is D50) of the lithium carbonate particle is from 20 nm to 20 μm. If the average particle size of the lithium carbonate particle is too small, it is not beneficial to disperse the lithium carbonate particle in a positive electrode slurry, if the average particle size of the lithium carbonate particle is too large, it will affect electronic conduction and ionic conduction of the positive electrode plate, thereby affecting electrical performance of the lithium-ion secondary battery. Preferably, the particle size of the lithium carbonate particle is from 100 nm to 5 μm.

In the positive electrode additive according to the first aspect of the present disclosure, the polymer may be one or more selected from a group consisting from poly(vinylidene fluoride-co-hexafluoropropylene) (PVDF-HFP), poly(vinylidene fluoride) (PVDF) polyacrylonitrile (PAN), poly (methyl methacrylate) (PMMA), polyacrylic acid (PAA), poly(ethylene oxide) (PEO), polyethylene (PE), polypropylene (PP), polytetrafluoroethylene (PTFE) and ethylene-propylene-butadiene terpolymer (EPDM).

In the positive electrode additive according to the first aspect of the present disclosure, a weight-average molecular mass of the polymer is from 50000 to 500000. Preferably, the weight-average molecular mass of the polymer is from 100000 to 250000.

In the positive electrode additive according to the first aspect of the present disclosure, a mass of the polymer coating is 1%-50% of a mass of the lithium carbonate particle.

Secondly, a preparation method of a positive electrode additive according to a second aspect of the present disclosure will be described.

The preparation method of the positive electrode additive according to the second aspect of the present disclosure is used for preparing the positive electrode additive according to the first aspect of the present disclosure comprises steps of: (1) dispersing a lithium carbonate particle in a solution comprising a polymer and an organic solvent to prepare a suspension; (2) treating the suspension by spray drying to obtain a positive electrode additive In the preparation method of the positive electrode additive according to the second aspect of the present disclosure, in step (1), the organic solvent may be one or more selected from a group consisting of ether, ester, nitrile, amide, alcohol and halogenated alkyl. Specifically, the ether may be selected from diethyl ether and/or tetrahydrofuran (THF); the ester may be one or more selected from a group consisting of ethyl acetate, methyl formate and dimethyl phthalate; the nitrile may be selected from acetonitrile; the amide may be selected from 1-methyl-2-pyrrolidinone and/or N,N-dimethyl-formamide; the alcohol may be one or more selected from a group consisting of methanol, etanol and isopropyl alcohol; the halogenated alkyl may be one or more selected from a group consisting of dichloromethane, trichloromethane and dichloroethane.

Next, a positive electrode plate according to a third aspect of the present disclosure will be described.

The positive electrode plate according to the third aspect of the present disclosure comprises a positive electrode current collector and a positive electrode film. The positive electrode film is provided on the positive electrode current collector and comprises a positive electrode active material. The positive electrode film further comprises the positive electrode additive according to the first aspect of the present disclosure.

In the positive electrode plate according to the third aspect of the present disclosure, the positive electrode film further comprises a conductive agent. The conductive agent may be one or more selected from a group consisting of graphite, acetylene black, conductive carbon black, super conductive carbon black, graphene, carbon nanotube, conductive fibre, metal powder and conductive organic polymer. The graphite may be selected from natural graphite or artificial graphite. The acetylene black may be selected from ketjen black. The conductive fibre may be selected from carbon fibre or metal fibre. The metal powder may be selected from copper powder or nickel powder. The conductive organic polymer may be selected from polyphenylene derivative.

In the positive electrode plate according to the third aspect of the present disclosure, the positive electrode film further comprises a binder. The binder may be one or more selected from a group consisting of poly(vinylidene fluoride), poly (vinyl alcohol), polyurethane, polyacrylic ester, butyl rubber, epoxy resin, polyvinyl acetal resin and chlorinated rubber.

In the positive electrode plate according to the third aspect of the present disclosure, the positive electrode active material may be one or more selected from a group consisting of layered lithium metal oxide, lithium-free metal oxide, spinel lithium metal oxide, lithium metal phosphate, lithium metal fluoride sulfate and lithium metal vanadate. The layered lithium metal oxide may be selected from lithium cobalt oxide (LCO), nickel cobalt manganese ternary material (NCM) and nickel cobalt aluminum ternary material (NCA). The lithium-free metal oxide may be selected from $V_2O_5$ and $MnO_2$. The spinel lithium metal oxide may be selected from lithium manganese oxide ($LiMn_2O_4$). The lithium metal phosphate may be selected from lithium iron phosphate (LFP). The lithium metal fluoride sulfate may be selected from lithium cobalt sulfate fluoride ($LiCoFSO_4$). The lithium metal vanadate may be selected from lithium nickel vanadate ($LiNiVO_4$).

In the positive electrode plate according to the third aspect of the present disclosure, the positive electrode current collector may be one or more selected from a group consisting of stainless steel, nickel, titanium, carbon, aluminum, eletroconductive resin, copper plate coated with nickel or titanium, and stainless steel coated with nickel or titanium.

In the positive electrode plate according to the third aspect of the present disclosure, a content of the positive electrode additive is 0.5%-10% of a mass of the positive electrode active material. If the content of the positive electrode additive is too high, it will decrease energy density of the positive electrode plate, thereby affecting power performance of the lithium-ion secondary battery and increasing an amount of gas to be generated when the lithium-ion secondary battery is in normal use. If the content of the positive electrode additive is too low, a current cut-off device cannot cut off the charging circuit in time when the lithium-ion secondary battery is overcharged and thermal runaway of the lithium-ion secondary battery cannot be effectively controlled. Preferably, the content of the positive electrode additive is 1%-5% of the mass of the positive electrode active material.

Next, a lithium-ion secondary battery according to a fourth aspect of the present disclosure will be described, which comprises the positive electrode plate according to the third aspect of the present disclosure.

The lithium-ion secondary battery according to the fourth aspect of the present disclosure further comprises a negative electrode plate, a separator and an electrolyte. The separator is provided between the positive electrode plate and the negative electrode plate.

In the lithium-ion secondary battery according to the fourth aspect of the present disclosure, the negative electrode plate comprises a negative electrode active material. The negative electrode active material may be one or more selected from a group consisting of artificial graphite, natural graphite, Si elementary substance, Sn elementary substance, $SiO_x$ (0<x<2), $SnO_y$ (0<y<2), Si alloy (that is alloy material formed by Si and one or more selected from a group consisting of Ti, Fe, Co, Ni and Cu) and Sn alloy (that is alloy material formed by Sn and one or more selected from a group consisting of Ti, Fe, Co, Ni and Cu).

In the lithium-ion battery according to the fourth aspect of the present disclosure, the electrolyte comprises a non-aqueous organic solvent and a solute dissolved in the non-aqueous organic solvent. Preferably, the non-aqueous organic solvent may be one or more selected from a group consisting of ethylene carbonate, propylene carbonate, dimethyl carbonate, diethyl carbonate, ethyl methyl carbonate and vinylene carbonate. The solute may be one or more selected from a group consisting of $LiPF_6$, $LiBF_4$, LiCl, $LiAlCl_4$, $LiSbF_6$, LiSCN, $LiCF_3SO_3$, $LiCF_3CO_2$, $LiN(CF_3SO_2)$, $LiAsF_6$ and $LiBC_4O_8$.

In the lithium-ion battery according to the fourth aspect of the present disclosure, a type of the separator is not specifically limited and may be any separator materials used in the existing lithium-ion secondary battery. Specifically, the separator may be selected from a polyethylene film, a polypropylene film, a polyvinylidene fluoride film and a multilayer composite film thereof.

Hereinafter the present disclosure will be described in detail in combination with examples. It should be noted that, the examples described in the present disclosure are only used for explaining the present disclosure, and are not intended to limit the present disclosure.

Example 1

(1) Preparation of a positive electrode additive: lithium carbonate particle (D50=20 μm) was dispersed in a non-aqueous THF solution comprising PVDF-HFP (weight-average molecular mass=500000) (a concentration of the PVDF-HFP is 10 wt %), a suspension was obtained, then the suspension was heated to 50° C. and stirred for 1 h at this temperature, next the suspension was treated by spray drying, a lithium carbonate particle with a polymer coating which coated the surface of the lithium carbonate particle was obtained, the positive electrode additive, that was the modified lithium carbonate, was obtained, wherein a mass of the polymer coating was 1% of the mass of the lithium carbonate particle.

(2) Preparation of a positive electrode plate: PVDF (binder) was dissolved in 1-methyl-2-pyrrolidinone, then positive electrode active material NCM (111), the positive electrode additive and acetylene black (conductive agent) were added in, after fully mixing, a positive electrode slurry was obtained, wherein a mass ratio of PVDF, NCM (111), the positive electrode additive and acetylene black was 3:100:10:2, then the positive electrode slurry was coated on both surfaces of an aluminum foil (positive electrode current collector) with a thickness of 12 μm, blast baking was then performed for 20 h under 85° C., which was followed by cold pressing and winding, a positive electrode plate was obtained.

(3) Preparation of a negative electrode plate: artificial graphite (negative electrode active material), acetylene black (conductive agent), styrene butadiene rubber latex (SBR, binder) and carboxymethyl cellulose sodium (CMC, thickening agent) at a mass ratio of 97:1:1.5:0.5 were dissolved in deionized water (solvent) to form a negative electrode slurry, then the negative electrode slurry was coated on both surfaces of a copper foil (negative electrode current collector), blast drying was then performed for 20 h under 110° C., which was followed by cold pressing and winding, a negative electrode plate was obtained.

(4) Preparation of an electrolyte: in an argon atmosphere glove box in which the water content was less than 10 ppm, ethylene carbonate, diethyl carbonate, ethyl methyl carbonate and vinylene carbonate at a mass ratio of 8:85:5:2 were mixed, a non-aqueous organic solvent was obtained, then the fully dried lithium salt $LiPF_6$ was dissolved into the mixed non-aqueous organic solvent, after uniformly mixing, the electrolyte was obtained, wherein a mass ratio of $LiPF_6$ and the mixed non-aqueous organic solvent was 8:92.

(5) Preparation of a lithium-ion secondary battery: the positive electrode plate, the separator, the negative electrode plate was laminated to make the separator separate the positive electrode plate from the negative electrode plate, then were wound to form an electrode assembly and placed in a package case, then the prepared electrolyte was injected, after vacuum packaging, standing-by, forming and shaping, a lithium-ion secondary battery was obtained.

Example 2

The preparation was the same as example 1, except that in: (1) preparation of a positive electrode additive, lithium carbonate particle (D50=5 μm) was dispersed in an acetonitrile solution (the concentration of PVDF-HFP was 20 wt %) comprising PVDF-HFP (weight-average molecular mass=100000), a suspension was obtained, then the suspension was heated to 50° C. and stirred for 1 h at this temperature, next the suspension was treated by spray drying, a lithium carbonate particle with a polymer coating which coated the surface of the lithium carbonate particle was obtained, the positive electrode additive, that was the modified lithium carbonate, was obtained, wherein a mass of the polymer coating was 10% of the mass of the lithium carbonate particle; (2) preparation of a positive electrode plate, PVDF (binder) was dissolved in 1-methyl-2-pyrrolidinone, then positive electrode active material NCM (523), the positive electrode additive and acetylene black (conductive agent) were added in, after fully mixing, a positive electrode slurry was obtained, wherein, a mass ratio of PVDF, NCM (523), the positive electrode additive and acetylene black was 3:100:1:2, then the positive electrode slurry was coated on both surfaces of an aluminum foil (positive electrode current collector) with a thickness of 12 μm, blast baking was then performed for 20 h under 85° C., which was followed by cold pressing and winding, a positive electrode plate was obtained.

Example 3

The preparation was the same as example 1, except that in: (1) preparation of a positive electrode additive, lithium carbonate particle (D50=500 nm) was dispersed in an acetonitrile solution (the concentration of PVDF-HFP was 20 wt %) comprising PVDF-HFP (weight-average molecular mass=100000), a suspension was obtained, then the suspension was heated to 50° C. and stirred for 1 h at this temperature, next the suspension was treated by spray drying, a lithium carbonate particle with a polymer coating which coated the surface of lithium carbonate particle was obtained, the positive electrode additive, that was the modified lithium carbonate, was obtained, wherein a mass of the polymer coating was 10% of the mass of the lithium carbonate particle; (2) preparation of a positive electrode plate, PVDF (binder) was dissolved in 1-methyl-2-pyrrolidinone, then positive electrode active material NCM (622), the positive electrode additive and acetylene black (conductive agent) were added in, after fully mixing, a positive electrode slurry was obtained, wherein, a mass ratio of PVDF, NCM (622), the positive electrode additive and acetylene black was 3:100:0.5:2, then the positive electrode slurry was coated on both surfaces of an aluminum foil (positive electrode current collector) with a thickness of 12 μm, blast baking was then performed for 20 h under 85° C., which was followed by cold pressing and winding, a positive electrode plate was obtained.

Example 4

The preparation was the same as example 1, except that in: (1) preparation of a positive electrode additive, lithium carbonate particle (D50=1 μm) was dispersed in an acetonitrile solution (the concentration of PAN was 5 wt %) comprising PAN (weight-average molecular mass=200000), a suspension was obtained, then the suspension was heated to 50° C. and stirred for 1 h at this temperature, next the suspension was treated by spray drying, the positive electrode additive, that was the modified lithium carbonate, was obtained, wherein a mass of the polymer coating was 5% of the mass of the lithium carbonate particle; (2) preparation of a positive electrode plate, PVDF (binder) was dissolved in 1-methyl-2-pyrrolidinone, then lithium cobaltate (positive electrode active material), the positive electrode additive and acetylene black (conductive agent) were added in, after fully mixing, a positive electrode slurry was obtained, wherein, a mass ratio of PVDF, lithium cobaltate, the positive electrode additive and acetylene black was 3:100:5:2, then the positive electrode slurry was coated on both surfaces of an aluminum foil (positive electrode current collector) with a thickness of 12 μm, blast baking was then performed for 20 h under 85° C., which was followed by cold pressing and winding, a positive electrode plate was obtained.

Example 5

The preparation was the same as example 1, except that in: (1) preparation of a positive electrode additive, lithium carbonate particle (D50=1 μm) was dispersed in an etanol solution (the concentration of PAA was 2 wt %) comprising PAA (weight-average molecular mass=250000), a suspension was obtained, then the suspension was heated to 50° C. and stirred for 1 h at this temperature, next the suspension was treated by spray drying, the positive electrode additive, that was the modified lithium carbonate, was obtained, wherein a mass of the polymer coating was 10% of the mass of the lithium carbonate particle; (2) preparation of a positive electrode plate, PVDF (binder) was dissolved in 1-methyl-2-pyrrolidinone, then positive electrode active material NCA, the positive electrode additive and acetylene black (conductive agent) were added in, after fully mixing, a positive electrode slurry was obtained, wherein, a mass ratio of PVDF, NCA, positive electrode additive and acetylene black was 3:100:3:2, then the positive electrode slurry was coated on both surfaces of an aluminum foil (positive electrode current collector) with a thickness of 12 μm, blast baking was then performed for 20 h under 85° C., which was followed by cold pressing and winding, a positive electrode plate was obtained.

Comparative Example 1

The preparation was the same as example 1, except that the positive electrode additive was ordinary lithium carbonate (that was, the lithium carbonate particle without the polymer coating).

Comparative Example 2

The preparation was the same as example 2, except that the positive electrode additive was ordinary lithium carbonate (that was, the lithium carbonate particle without the polymer coating).

Comparative Example 3

The preparation was the same as example 3, except that the positive electrode additive was ordinary lithium carbonate (that was, the lithium carbonate particle without the polymer coating).

Comparative Example 4

The preparation was the same as example 4, except that the positive electrode additive was ordinary lithium carbonate (that was, the lithium carbonate particle without the polymer coating).

Comparative Example 5

The preparation was the same as example 5, except that the positive electrode additive was ordinary lithium carbonate (that was, the lithium carbonate particle without the polymer coating).

Finally, test processes and test results of examples 1-5 and comparative examples 1-5 were described.

(1) Testing of Rate Performance of the Lithium-Ion Secondary Battery

At 25° C., after standing-by for 5 min, the lithium-ion secondary battery was charged to a voltage of 4.2V at a constant current of 0.5 C, then the lithium-ion secondary battery was charged to a current of 0.05 C at a constant voltage of 4.2V, the lithium-ion secondary battery reached a fully charged state (100% SOC) at this time, after standing-by for 5 min, the lithium-ion secondary battery was discharged to a voltage of 3.0V at constant current of 0.1 C and 1 C respectively. Four lithium-ion secondary batteries were tested in each group to take an average value.

> Discharged rate performance of the lithium-ion secondary battery of 1 C/0.1 C (%)=Discharged capacity after 10th cycles of 1 C of the lithium-ion secondary battery/Discharged capacity after 10th cycles of 0.1 C of the lithium-ion secondary battery×100%.

(2) Testing of Safety Performance of the Lithium-Ion Secondary Battery

At 25° C., after standing-by for 5 min, the lithium-ion secondary battery was charged to a voltage of 4.2V at a constant current of 0.5 C, then the lithium-ion secondary battery was charged to a current of 0.05 C at a constant voltage of 4.2V, the lithium-ion secondary battery reached a fully charged state (100% SOC) at this moment, after standing by for 5 min, the lithium-ion secondary battery was charged to a voltage of 5V at a rate of 0.1 C, then continued to charge the lithium-ion secondary battery at a constant voltage of 5V, until the current cut-off device of the lithium-ion secondary battery started its function, the voltage of overcharge termination of the lithium-ion secondary battery (that was, overcharge failure voltage) and the state of SOC (that was, overcharge failure SOC) were obtained. Four lithium-ion secondary batteries were tested in each group to take an average value.

TABLE 1

Test results of performance of examples 1-5 and comparative examples 1-5

|  | 1 C/0.1 C discharged rate performance (%) | Overcharge failure voltage (V) | Overcharge failure SOC |
| --- | --- | --- | --- |
| Example 1 | 89 | 5 | 180% |
| Example 2 | 93 | 4.7 | 165% |
| Example 3 | 97 | 4.5 | 140% |
| Example 4 | 94 | 4.5 | 180% |
| Example 5 | 92 | 4.45 | 135% |
| Comparative example 1 | 87 | 5 | Thermal runaway |
| Comparative example 2 | 93 | 5 | Thermal runaway |
| Comparative example 3 | 96 | 4.9 | 220% |
| Comparative example 4 | 95 | 5 | Thermal runaway |
| Comparative example 5 | 92 | 4.8 | 190% |

It could be seen from Table 1, there was no significant differences of rate performance of the lithium-ion secondary battery in examples 1-5 and the lithium-ion secondary battery in comparative examples 1-5, this showed that the positive electrode additive of the present disclosure basically had no effect on electric performance of the lithium-ion secondary battery.

It could be seen from Table 1, safety performance of the lithium-ion secondary batteries in examples 1-5 had greater improvement than the lithium-ion secondary batteries in comparative examples 1-5, overcharge failure voltage and overcharge failure SOC of the lithium-ion secondary battery were decreased. Overcharge failure voltage and overcharge failure SOC of the lithium-ion secondary battery in comparative examples 1-5 were higher, even thermal runaway occurred before the current cut-off device started its function. This showed that the positive electrode additive of the present disclosure was more sensitive to the voltage than the ordinary lithium carbonate, when the lithium-ion secondary battery was overcharged, it could decompose and generate gas in time, which could increase the internal pressure of the battery, and make the pressure detecting type current cut-off device play a role, thereby effectively preventing thermal runaway of the lithium-ion secondary battery.

According to the above description, those skilled in the art may also make an appropriate change and modification to the above examples. Therefore, the present disclosure is not limited to the specific examples disclosed and described above, and some change and modifications to the present disclosure should also fall within the scope of protection of the Claims of the present disclosure.

What is claimed is:

1. A positive electrode additive, wherein the positive electrode additive comprises a modified lithium carbonate, the modified lithium carbonate comprises:
    a lithium carbonate particle; and
    a polymer coating, the polymer coating coats a surface of the lithium carbonate particle and comprises a polymer.

2. The positive electrode additive according to claim 1, wherein an average particle size of the lithium carbonate particle is from 20 nm to 20 μm.

3. The positive electrode additive according to claim 2, wherein the average particle size of the lithium carbonate particle is from 100 nm to 5 μm.

4. The positive electrode additive according to claim 1, wherein the polymer is one or more selected from a group consisting from poly(vinylidene fluoride-co-hexafluoropropylene), poly(vinylidene fluoride), polyacrylonitrile, poly(methyl methacrylate), polyacrylic acid, poly(ethylene oxide), polyethylene, polypropylene, polytetrafluoroethylene and ethylene-propylene-butadiene terpolymer.

5. The positive electrode additive according to claim 4, wherein a weight-average molecular mass of the polymer is from 50000 to 500000.

6. The positive electrode additive according to claim 5, wherein the weight-average molecular mass of the polymer is from 100000 to 250000.

7. The positive electrode additive according to claim 1, wherein a mass of the polymer coating is 1%~50% of a mass of the lithium carbonate particle.

8. A positive electrode plate, comprising a positive electrode current collector; and a positive electrode film provided on the positive electrode current collector and comprising a positive electrode active material;
    wherein,
    the positive electrode film further comprises a positive electrode additive;
    the positive electrode additive comprises a modified lithium carbonate, the modified lithium carbonate comprises a lithium carbonate particle and a polymer coating, the polymer coating coats a surface of the lithium carbonate particle and comprises a polymer.

9. The positive electrode plate according to claim 8, wherein an average particle size of the lithium carbonate particle is from 20 nm to 20 μm.

10. The positive electrode plate according to claim 8, wherein the polymer is one or more selected from a group consisting from poly(vinylidene fluoride-co-hexafluoropropylene), poly(vinylidene fluoride), polyacrylonitrile, poly(methyl methacrylate), polyacrylic acid, poly(ethylene oxide), polyethylene, polypropylene, polytetrafluoroethylene and ethylene-propylene-butadiene terpolymer.

11. The positive electrode plate according to claim 10, wherein a weight-average molecular mass of the polymer is from 50000 to 500000.

12. The positive electrode plate according to claim 8, wherein a mass of the polymer coating is 1%~50% of a mass of the lithium carbonate particle.

13. The positive electrode plate according to claim 8, wherein a content of the positive electrode additive is 0.5%~10% of a mass of the positive electrode active material.

14. The positive electrode plate according to claim 13, wherein the content of the positive electrode additive is 1%~5% of a mass of the positive electrode active material.

15. A lithium-ion secondary battery comprising a positive electrode plate;

the positive electrode plate comprising a positive electrode current collector and a positive electrode film provided on the positive electrode current collector and comprising a positive electrode active material;

the positive electrode film further comprising a positive electrode additive, the positive electrode additive comprising a modified lithium carbonate, the modified lithium carbonate comprising a lithium carbonate particle and a polymer coating, the polymer coating coated a surface of the lithium carbonate particle and comprising a polymer.

16. The lithium-ion secondary battery according to claim 15, wherein an average particle size of the lithium carbonate particle is from 20 nm to 20 μm.

17. The lithium-ion secondary battery according to claim 15, wherein the polymer is one or more selected from a group consisting from poly(vinylidene fluoride-co-hexafluoropropylene), poly(vinylidene fluoride), polyacrylonitrile, poly(methyl methacrylate), polyacrylic acid, poly(ethylene oxide), polyethylene, polypropylene, polytetrafluoroethylene and ethylene-propylene-butadiene terpolymer.

18. The lithium-ion secondary battery according to claim 17, wherein a weight-average molecular mass of the polymer is from 50000 to 500000.

19. The lithium-ion secondary battery according to claim 15, wherein a mass of the polymer coating is 1%~50% of a mass of the lithium carbonate particle.

20. The lithium-ion secondary battery according to claim 15, wherein a content of the positive electrode additive is 0.5%~10% of a mass of the positive electrode active material.

* * * * *